March 6, 1962 S. F. TRUSH 3,024,438
TEST CONNECTOR
Filed Jan. 5, 1959
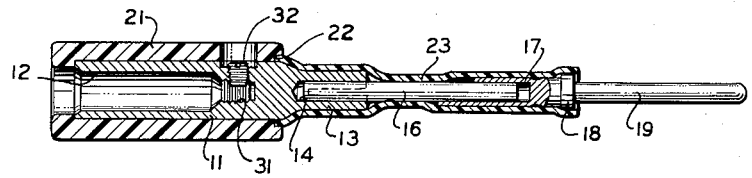
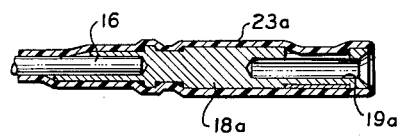
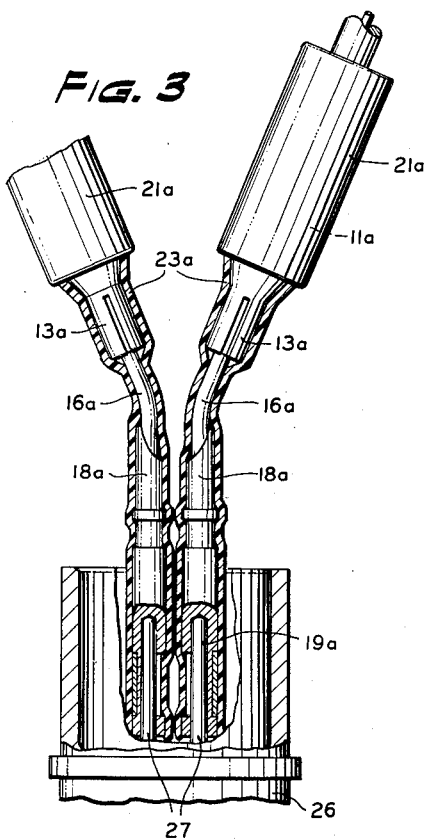
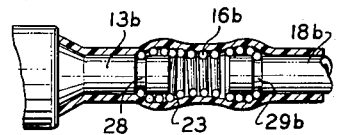
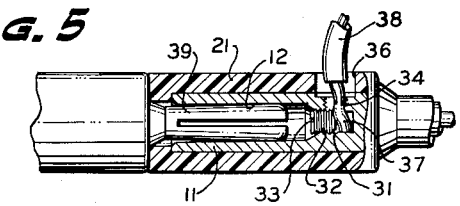
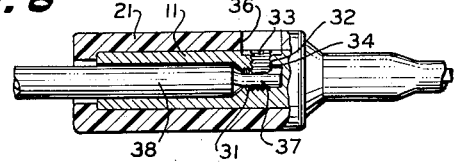
STEVEN F. TRUSH
INVENTOR.
HERZIG & JESSUP,
BY ATTORNEYS.
Warren T. Jessup United States Patent Office 3,024,438
Patented Mar. 6, 1962

3,024,438
TEST CONNECTOR
Steven F. Trush, Lancaster, Calif.
(P.O. Box 8, Morrisville, N.Y.)
Filed Jan. 5, 1959, Ser. No. 784,911
1 Claim. (Cl. 339—28)

This invention relates to a manufacture in the form of a test connector, and more particularly a test connector adapted for making temporary test connections to a multiple electric connector, such as is used with electronic equipment.

The circuitry of electronic equipment is often tested by applying one or more test leads to the plugs or connectors at the exterior of the equipment housing. Such test connectors stick out temporarily from the housing, and in the test operations it is not unusual for the test connector to be accidentally struck from the side. Such blows, in the past, have often damaged either the test connector or the equipment connector, or both. If the latter is damaged, as by bending of a pin connector or by fracture of the ceramic base in which the equipment connector is mounted, the repair involves dismantling the equipment to gain access to the equipment connector for removal and replacement. This is a costly and time consuming job. It is accordingly an object of this invention to so design a test connector that damage will not result in case the connector is accidentally struck from the side.

Multiple connectors by which electrical communication is made to electric or electronic equipment usually have a series of pin connectors or sockets spaced closely together in a multiple outlet. In the testing of the equipment, it is often necessary to make temporary test connections to one or more closely adjacent pins or sockets. This has been found very difficult in the past, because the bulky portion of the test connector, which is generally the external protruding terminal, is such as to preclude the plugging in of two adjacent test connectors. It is accordingly an object of this invention to provide a test connector of such design that a plurality of such test connectors can be engaged with respective adjacent pins or connectors in a multiple connector without interference among adjacent test connectors.

It is the further object of this invention to provide simplified yet very effective sheathing arrangements for completely insulating all external portions of a test connector.

Another object of this invention is to provide a terminal for a test connector which may alternatively accept a lead wire or conductor either axially at one end, or radially into the side of the terminal.

It is another object of this invention to provide a terminal for a test connector such that a standard plug, known as a banana plug, may be injected axially into one end of the test connector and simultaneously an auxiliary lead or conductor may be clamped radially into the side of the test connector.

In accordance with these and other objects which will become apparent hereinafter, preferred forms of the present invention will now be described with reference to the accompanying drawings wherein:

FIG. 1 is a longitudinal sectional view of one form of the test connector of this invention illustrating a pin type test connector.

FIG. 2 is a fragmentary view illustrating the application of the present invention to a socket type test connector.

FIG. 3 is a cross-section illustrating a pair of test connectors constructed in accordance with the present invention, as used with a multiple connector such as might be attached to a cable or directly mounted on the housing of electronic equipment.

FIG. 4 is a fragmentary section illustrating another form of the present invention.

FIG. 5 is a longitudinal fragmentary section illustrating the use of the test connector with a conventional banana plug and the auxiliary and simultaneous use of another electric lead wire.

FIG. 6 is a view similar to FIG. 5 showing an alternative use of the terminal portion of the test connector with a lead wire entering the terminal axially.

Referring to FIG. 1, the test connector of the present invention is shown as comprised of a substantially cylindrical terminal portion 11 made of relatively rigid conductive material such as bronze or other copper alloy. An axial bore 12 is formed in one end of the terminal 11 for the purpose of accommodating a test plug, such as a banana plug, as shown in FIG. 5. The terminal 11 is ensmalled at 13, and into an axial bore 14 therein is pressed and secured, as by welding or soldering, an elongate conductor 16 preferably in the form of a solid copper wire. In contrast to the terminal 11, the wire 16 is made of soft copper and is relatively bendable or pliant, whereas the terminal 11, including the portion 13, is stiff and manually unbendable. The other or extending end of the wire 16 fits into a bore 17 of an elongate connector 18, which is aligned with the wire 16 and with the cylindrical terminal 11, as shown in FIG. 1. The wire 16 is secured in the bore 17 as by welding or soldering. The connector 18 includes an extending portion 19 which is adapted to telescopically connect with a complementary electrical fitting. In the example illustrated in FIG. 1, the telescoping connector is in the form of a pin 19 adapted to engage in a suitable complementary socket in a conventional electrical connector, such as is used at the end of a multiple lead wire or mounted in the wall or housing of electrical or electronic equipment.

The connector 18, including the pin 19, is, like the terminal 11, made of rigid conducting material such as bronze or other copper alloy, and is preferably silver and/or gold plated for low contact resistance.

When the test connector shown in FIG. 1 is engaged with a socket, the pin 19 being telescopically engaged therein, the left hand portion of the test connector, shown in FIG. 1 often protrudes out well away from the connector or equipment housing. In this position, the test connector is in danger of being struck from the side, so that a bending moment force is applied thereto. In the past, the rigidity of the test connector has transmitted this bending moment directly to the socket or other connector of the electronic equipment, and often results in damage to the connector. In the case of a pin test connector 19 imbedded in an equipment socket, the damage often consists of fracturing the ceramic body in which the socket is mounted, with the result that the equipment must be dismantled in order to remove and replace the ceramic or the entire connector.

In accordance with the present invention, the pliancy of the soft copper wire 16 permits the test connector to give in response to the blow, and it readily bends to one side as shown in FIG. 3. As a result, the force of a blow is harmlessly absorbed, and thereby both the equipment connector and the test connector are protected from damage. If desired, the test connector may be quickly straightened out by virtue of the bendable nature of the wire 16.

As shown in FIG. 1, the test connector is completely sheathed with insulation except for the extending pin connector 19 which must of course be bare. This is effected by a cylindrical insulator 21 which is fitted and secured over the larger portion of the terminal 11. The sheath 21 is preferably made of a relatively rigid plastic such as polystyrene. On the face of the sheath 21 which faces toward the conductor 16, and immediately adjacent the terminal 18, is formed a circular groove 22. Into this groove is seated one end of a pliant, somewhat stretchable, tube or sheath of insulation 23 which covers the remaining portion of the test connector up to the pin 19, namely the ensmalled portion 13 of the terminal 11, the conductor 16 and the connector base 18. The pliancy of the sheath 23 not only permits it to be slipped over the metal portions of the test connector in the fabrication process, but also permits it to bend readily with the bending of the conductor 16 as shown in FIG. 3. The stretchable nature of the sheath 23, although slight, allows it to expand around the larger portion of the terminal 11 and enter into the groove 22 as shown in FIG. 1.

Application of the present invention to a socket connector (as opposed to a pin connector) is shown in FIG. 2, wherein the connector 18a has an extended telescoping portion in the form of a socket 19a adapted to telescope over a pin connector of the electronic equipment. As in the case of the pin connector shown in FIG. 1, the pliant conductor 16a is secured to the connector 18a at the end opposite to the socket 19a and aligned therewith. In the case of the socket connector shown in FIG. 2, the sheath 23a covers the connector to the extreme end thereof, since, being a socket, it is not necessary that any portion be left bare.

FIG. 3 illustrates a connector of the socket form shown in FIG. 2 used with a multiple connector 26 having a plurality of closely spaced extending pins 27 over which the several sockets 19a telescopically engage. Were it not for the bendable nature of the conductor 16a, forming the intermediate portion of the test connector, the larger terminal portions 11a of two adjacent test connectors would interfere with each other and prevent engagement with adjacent pins 27. By bending the terminals 11a to one side, as shown in FIG. 3, it is possible to engage several adjacent pins 27 without interference by adjacent test connectors. As noted hereinbefore, the pliant or bendable nature of the conductor 16 (or 16a) also protects both the test connector and the equipment connector 26 from damage by accidental striking of the test connector from the side.

In FIG. 4 there is shown an alternative form of pliant intermediate conductor which, in this figure, assumes the form of the resilient elongate helical spring 16b secured at its respective ends to the connector 18b and the terminal 13b. Any suitable means may be employed for this securement. In the example shown in FIG. 4, the ensmalled portion 13b of the terminal is provided with an annular groove 28 into which one or more coils at the end of the helix 16b slip for enhanced securement. A similar groove 29b may be provided in the connector 18b. This securement is also preferably fortified by bonding such as soldering. As in the previous embodiments, a pliant insulating sheath 23b covers the test connector.

In the FIG. 4 modification, the intermediate conductor portion 16b is not only pliant but is also resilient. Therefore, upon being bent to one side by a bending moment, it returns to its straight line position when the bending force is removed. Thus, the test connector readily gives, in response to an accidental blow on the terminal portion 11, but promptly resumes its erect or linear attitude upon removal of the force. Similarly, when the connectors are deliberately bent to one side, as in the use illustrated in FIG. 3, the resiliency of the spring 16b keeps the terminal portions 11 nested closely to each other, but there is no appreciable pressure exerted because of the give in the springs 16b.

Another valuable feature of the present invention is illustrated in FIGS. 5 and 6, with reference being made also to FIG. 1 for an understanding of the structural details. As shown, the inner end of the bore 12 is ensmalled and threaded at 31 and thereby adapted to receive a set screw 32 having the usual kerf 33 in the head thereof. The terminal 11 is also provided with a threaded radial bore 34 which is substantially identical in both bore and thread to the portion 31.

The insulating sheath 21 is provided with an opening or hole 36 aligned with the bore 34 and somewhat larger, in order to give ready access to the bore 34.

With the structure as described, a lead wire or conductor 37 may be passed into the bore 31 through the bore 34 and clamped in place by the set screw 32 threaded into the bore 31 and accessible through the bore 12. The lead wire 37 is usually insulated as shown at 38. Alternatively, as shown in FIG. 6, the lead wire 37 may be passed into the bore 31 through the bore 12, in this case being clamped in place by the set screw 32, now moved into the bore 34 and accessible through the opening 36 in the sheath 21. Thus, the terminal 11 provides two orthogonally related approaches, from which a lead wire or conductor may engage the terminal.

When employed as shown in FIG. 5, another connection may be simultaneously made to the terminal 11 by means of the conventional test plug 39, well known in the art as a banana plug. In this case, two connections are simultaneously and readily made to the terminal 11, one through the banana plug 39 and the other through the lead wire 37 entering the terminal from the side and through the opening 36.

While the instant invention has been shown and described herein in what is conceived to be the most practical and preferred embodiments, it is recognized that departures may be made therefrom within the scope of the invention which is therefore not to be limited to the details disclosed herein but is to be afforded the full scope of the claim.

What is claimed is:

A test connector including: a rigid substantially cylindrical terminal portion composed of a conductive material and having a first axial bore formed in one end thereof for receiving a test plug, and the like, and further having a second axial bore at the other end thereof, a flexible conductor of sufficient rigidity to be capable of sustaining itself in at least one particular position having one end extending into said second axial bore and secured to said terminal portion in electrical contact therewith, a rigid substantially cylindrical connector portion having a bore formed in one end thereof for receiving the other end of said elongated conductor, said cylindrical connector portion including telescopic connecting means at the other end thereof for engaging a complementary fitting in electrical contact therewith for test purposes, said other end of said elongated conductor being secured to said connector portion in electrical contact therewith, a relatively rigid insulating shearth fitted over said terminal portion, and a pliant sheath of insulating material extending from said rigid sheath over said elongated conductor and over at least a portion of said connector portion, said first bore being closed at the inner end thereof and having at least a portion of its inner end threaded, said terminal portion also having a threaded radial bore connecting with said inner end of said axial bore and being substantially identical thereto in diameter and thread and terminating at said axial bore, said inner end of said axial bore being adapted to receive a set screw for clamping into said terminal a conductor passing through said radial bore into the inner end of said axial bore while also having a test plug or the like in the outer portion thereof, and said radial bore being adapted to receive alternatively the same set screw for alternatively clamping into said terminal portion a conductor passed through said axial bore into said inner end thereof.

References Cited in the file of this patent

UNITED STATES PATENTS

| | | |
|---|---|---|
| 1,257,669 | Bliss | Feb. 26, 1918 |
| 1,926,163 | Mohr | Sept. 12, 1933 |
| 2,353,199 | Stoffel et al. | July 11, 1944 |
| 2,393,083 | Wisegarver | Jan. 15, 1946 |
| 2,794,099 | Swain | May 28, 1957 |

FOREIGN PATENTS

| | | |
|---|---|---|
| 3001/26 | Australia | July 27, 1926 |
| 720,908 | Great Britain | Dec. 29, 1954 |
| 895,288 | France | Mar. 27, 1944 |